United States Patent
Verdy et al.

(10) Patent No.: US 8,185,729 B2
(45) Date of Patent: May 22, 2012

(54) METHOD OF CONVERTING PERSONAL COMPUTERS INTO THIN CLIENT COMPUTERS

(75) Inventors: Stephane Verdy, King of Prussia, PA (US); Ian Geiser, West Chester, PA (US)

(73) Assignee: Devon IT, Inc., King of Prussia, PA (US)

( * ) Notice: Subject to any disclaimer, the term of this patent is extended or adjusted under 35 U.S.C. 154(b) by 398 days.

(21) Appl. No.: 12/548,896

(22) Filed: Aug. 27, 2009

(65) Prior Publication Data
US 2011/0055535 A1 Mar. 3, 2011

(51) Int. Cl.
*G06F 9/00* (2006.01)
*G06F 9/24* (2006.01)
*G06F 15/177* (2006.01)
(52) U.S. Cl. .................................. 713/2; 713/1
(58) Field of Classification Search ................... 713/1, 2
See application file for complete search history.

(56) References Cited

U.S. PATENT DOCUMENTS

| | | | |
|---|---|---|---|
| 6,963,981 B1* | 11/2005 | Bailey et al. | 726/22 |
| 6,996,706 B1* | 2/2006 | Madden et al. | 713/2 |
| 2004/0243997 A1* | 12/2004 | Mullen et al. | 717/174 |
| 2008/0172555 A1* | 7/2008 | Keenan | 713/2 |
| 2010/0036889 A1* | 2/2010 | Joshi et al. | 707/200 |
| 2011/0016175 A1* | 1/2011 | Mitsuoka et al. | 709/203 |

* cited by examiner

*Primary Examiner* — Vincent Tran
(74) *Attorney, Agent, or Firm* — Miller Law Group, PLLC

(57) ABSTRACT

A system repurposes a personal computer operating with a conventional personal computer operating system, such as Windows® operating system, into a thin client computer system without requiring that the hard drive of the personal computer be re-formatted to remove the previous operating system. The personal computer has its boot loader configuration file edited to include a call to a thin client boot loader file to execute the thin client operating system stored on the personal computer hard drive instead of the previous operating system of the personal computer. The repurposed personal computer can be returned to the previous operating system by electing to bypass the thin client operating system. As a thin client computer, the repurposed personal computer is managed from a central server and can access applications and data on remote servers instead of using the application programs on the hard drive or the capability of storing data on the personal computer hard drive.

14 Claims, 3 Drawing Sheets

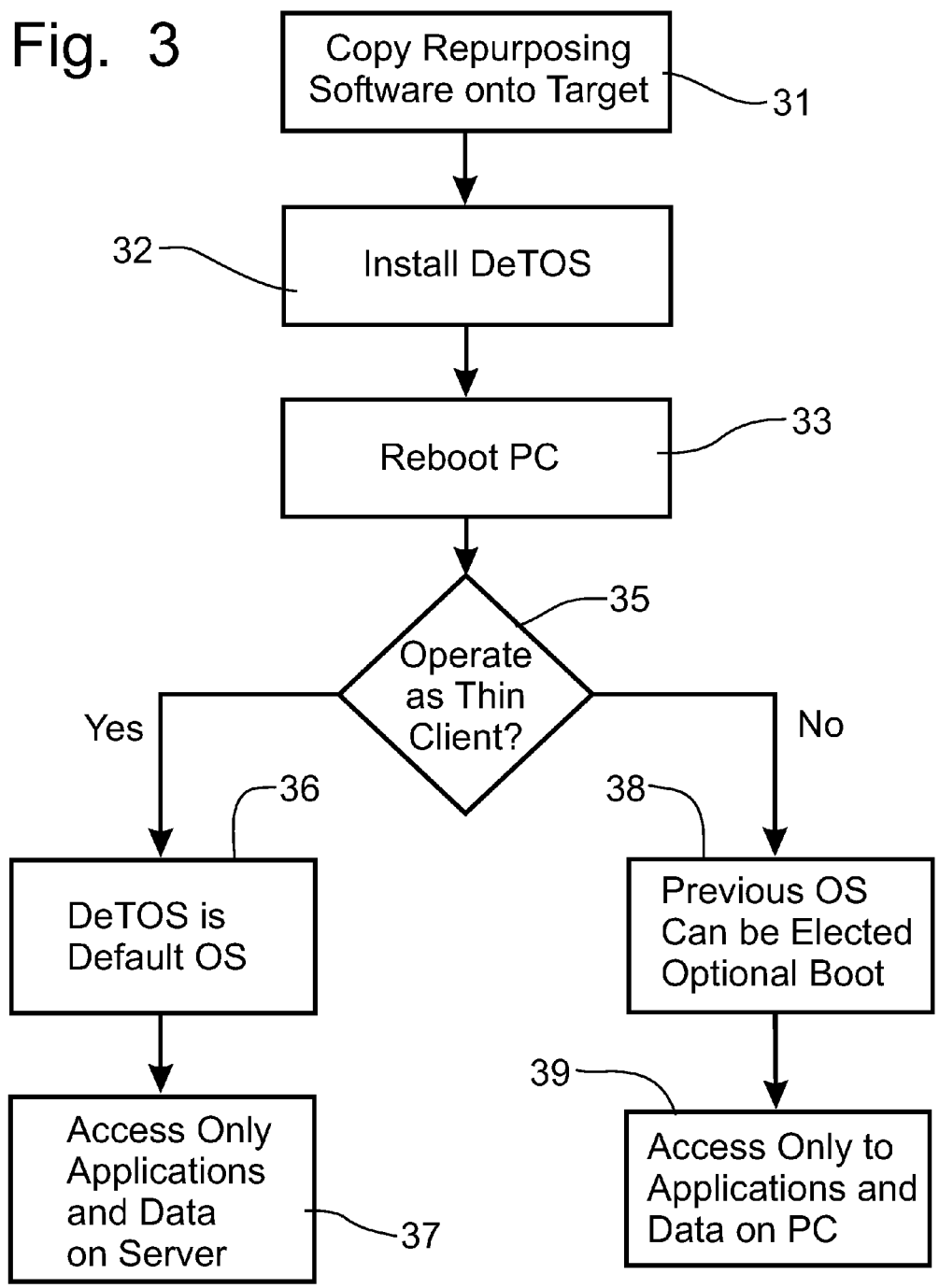

METHOD OF CONVERTING PERSONAL COMPUTERS INTO THIN CLIENT COMPUTERS

FIELD OF THE INVENTION

The present invention relates generally to the operation of personal computers, particularly personal computers connected to a network, and, more particularly, to a method by which old personal computers can be converted into thin client computers.

BACKGROUND OF THE INVENTION

The Internet has brought many advantages in communications to its users, but has also brought substantial security concerns along with those advantages. Hackers gain access to private records of individuals and of corporations and governmental agencies through their connection to the Internet. Identity theft has become a buzzword for a major crime in which a person's secret account numbers, access codes, social security numbers, and other related information are stolen from a person and used to charge purchases, transfer funds, etc. from the person rightfully entitled thereto. Such theft is usually the result of a theft of the information from an owner's computer. Each transaction in which secret information of the owner is transmitted to a third party becomes subject to invasion by a hacker. Once a hacker has access into a person's computer, the electronic files in conventional Windows programs wherein account numbers and passwords are located are easily identified and opened.

Personal computers are typically loaded with an operating system, such as the Windows® operating system, from which is run application programs such as spread sheets, word processing and accounting programs that often contain sensitive and proprietary information. Typically viruses, Trojan horses, rootkits and other malicious programs that might contaminate a personal computer are based on the Windows® operating system and require a computer utilizing Windows® software to propagate and to operate.

Corporate computer departments typically have servers centrally located with a plurality of personal computers connected to the servers through a network. Generally, personal computers are considered to have an effective life span of three to four years such that the corporate IT staff is replacing the personal computers within the corporation on a cycle that replaces all of the personal computers approximately every four years. Personal computers have their own operating systems, usually Windows® software and application programs loaded on the personal computer, resulting in substantially large total licensing fees for the corporation. Thin client computers are computers that have an operating system that permits the computer to be connected to a file server to receive application software and data without the ability to save data on a hard drive within the thin client computer system.

It would be desirable to provide a method of extending the effective life of personal computers without suffering a loss in operative effectiveness. It would also be desirable to provide a method of converting old personal computers into thin client computer systems that have less susceptibility to attack from malicious software and to loss of data from the computer hard drive.

SUMMARY OF THE INVENTION

It is an object of this invention to overcome the aforementioned disadvantages of the known prior art by providing a system for converting personal computers into thin client computers.

It is another object of this invention to provide a method of extending the operative life of a personal computer by converting the personal computer into a thin client computer.

It is a feature of this invention that the effective useful life of a personal computer can be extended.

It is an advantage of this invention that hard drive failures on a personal computer would not necessarily terminate the effective life of the personal computer if converted into a thin client.

It is another feature of this invention that the conversion of a personal computer into a thin client computer enables the thin client to run application software from a server, as well as store data on the server instead of on the personal computer.

It is an object of this invention to install a thin client operating system on a personal computer without removing the previously installed operating system on the personal computer.

It is still another feature of this invention that the installation of the software onto a personal computer bypasses the boot sequence of the previously installed operating system so the previously installed operating system does not execute.

It is still another advantage of this invention that Windows® based malicious software cannot run on the personal computer because Windows® software is not executed as the operating system of the personal computer.

It is still another feature of this invention that the initial Windows® boot loader is reconfigured to call a Linux boot loader to start the thin client operating system.

It is still another advantage that booting the personal computer up into a thin client operating system creates a substantial security advantage over the utilization of the Windows® operating system.

It is yet another feature of this invention that the thin client operating system becomes the default boot operating system, although the user can elect to execute the Windows® operating system.

It is yet another advantage of this invention that the thin client executable code, binaries, libraries and configuration files are added to the personal computer hard drive without repartitioning the hard drive and without erasing any existing files on the hard drive.

It is still another advantage of this invention that once the thin client operating system has been installed on the personal computer the user cannot access the rest of the files on the hard drive and cannot store files on the hard drive.

It is yet another object of this invention to repurpose a personal computer running Windows® software into a thin client computer running a secure, locked down, stateless, Linux-based operating system.

It is yet another advantage of this invention that upon the ultimate failure of the repurposed computer, the repurposed personal computer can be replaced with a simple plug-and-play thin client computer replacement.

It is another advantage of this invention that the risk of switching to a virtualized architecture is minimized as the personal computer can be returned to its previous operating system.

It is a further advantage of this invention that the capital investment in personal computers can be extended by extending the effective operative life of the personal computer with the repurposing into a thin client computer.

It is a further feature of this invention that the personal computers operating as repurposed thin client computers can be centrally managed from a server.

It is a still further feature of this invention that the updates in application software will be automatically deployed for the users of the repurposed thin client computers.

It is still another object of this invention that the hard drive of the repurposed personal computer does not require re-formatting to be operated as a thin client computer, allowing the previous personal computer operating system to become the default boot system with the uninstallation of the thin client operating system.

It is yet another object of this invention to provide a system for re-purposing personal computers into a thin client computer to be stored in parallel with the previous operating system of the personal computer, while offering rapid deployment, easy installation, minimal maintenance and unparalleled network protection.

These and other objects, features and advantages are accomplished according to the instant invention by providing a system for repurposing a personal computer operating with a conventional personal computer operating system, such as Windows® operating system, into a thin client computer system without requiring the that hard drive of the personal computer be re-formatted to remove the previous operating system. The personal computer has its boot loader configuration file edited to include a call to a thin client boot loader file to execute the thin client operating system stored on the personal computer hard drive in parallel with the previous operating system of the personal computer. The repurposed personal computer can be returned to the pervious operating system by electing to bypass the thin client operating system. As a thin client computer, the repurposed personal computer accesses application programs and data from a central server without using the application programs on the hard drive or the capability of storing data on the personal computer hard drive.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

FIG. 3 is a logic flow diagram of the operation of the system according to the principles of the instant invention.

DETAILED DESCRIPTION OF THE PREFERRED EMBODIMENT

Figure 1:
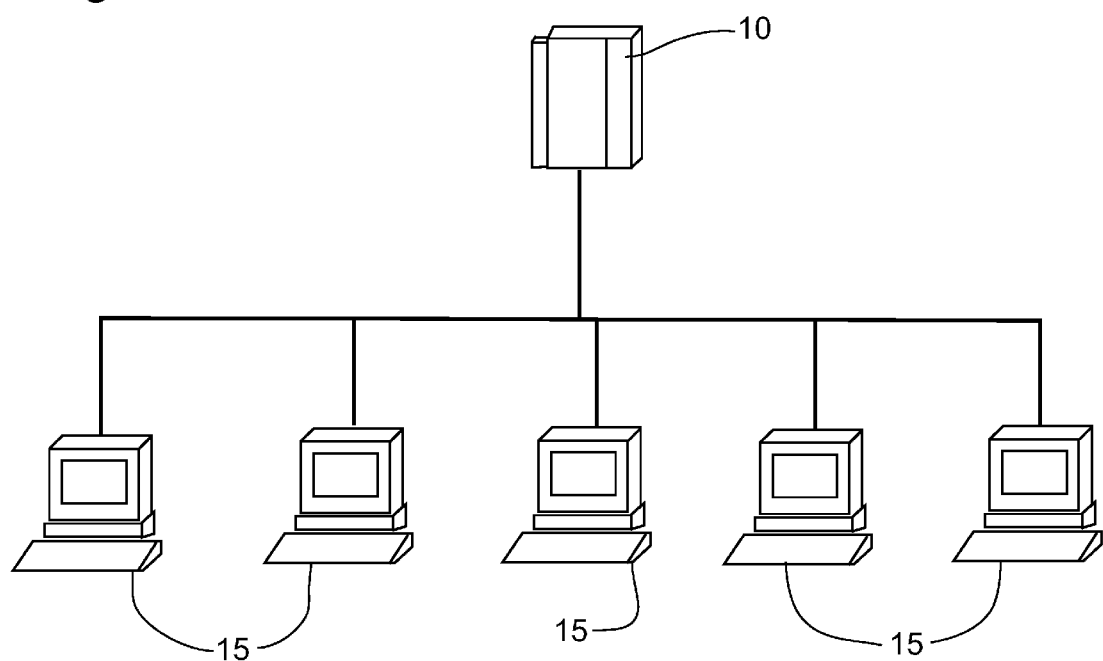
FIG. 1 is a schematic diagram of a network having a central server computer coupled to remote personal computers that can be repurposed into thin client computers by the system incorporating the principles of the instant invention.

Referring to FIG. 1, a networked computer system is schematically represented by the central server computer 10 and the remote personal computers 15 that are operatively connected to the central server computer 10 for conventional purposes such as sharing printers, access to the internet, e-mail, etc. Each conventionally operated remote personal computer 15 has an operating system, often Microsoft Windows® operating system, application software, such as spread sheets, word processing, graphics programs, etc., and data associated with the application programs stored on the hard drive 16, which is a conventional part of each personal computer. With respect to the application software and data, each personal computer can be operated independently, though the data can usually be retrieved from other personal computers within the network.

Thin client computers are remotely connected to a central server computer 10, but do not operate application software stored on a local hard drive. Thin client computers typically do not have a hard drive and have no use for one because the application software is accessed from the central server computer 10 and the data is stored and accessed from the central server computer 10. Particularly when the thin client computer is portable, such as a laptop-type of computer, the loss of the thin client computer is not a risk to the potentially confidential and proprietary data that would normally be stored on a corresponding conventional personal computer. Furthermore, the operating system for a thin client computer is not the conventional Microsoft Windows® operating system, but typically a Linux operating system, which has a smaller footprint for access by hackers and attack from malicious software, such as viruses, malware, worms, etc., which are typically configured to attack the Windows® operating system.

Personal computers have a statistically definable effective life span. The operating software is typically updated and upgraded, sometimes requiring additional hardware resources, and the business applications that run locally might also require an increased amount of processing and storage. As a result, personal computers are often replaced on a four or five year cycle at many corporations. Thin client computers do not require as many hardware resources as counterpart personal computers as there is no need to execute local business applications or to store local data. Therefore thin client computers do not need to be upgraded when business applications processing and storage requirements increase. Thus, converting a personal computer into a thin client computer allows extending its effective operative life.

The system incorporating the instant invention can be installed on a personal computer 15, such as an old personal computer near the end of its replacement cycle, to convert or repurpose the personal computer 15 into a thin client computer to extend the operative life of the personal computer 15 and, thereby, delay replacement thereof. Software utilized to repurpose the personal computer 15 is loaded onto the hard drive 16 of the personal computer 15 by editing the existing boot loader configuration file (boot.ini) to add an entry that calls for the thin client operating software that is saved on the personal computer hard drive 16. The loading of the repurposing software can be accomplished from the central server computer 10 to each of the personal computers 15 on the network associated with the server computer 10, or each personal computer 15 can have the repurposing software loaded into the input devices, such as a CD/DVD drive or from a USB flash drive.

Figure 2:
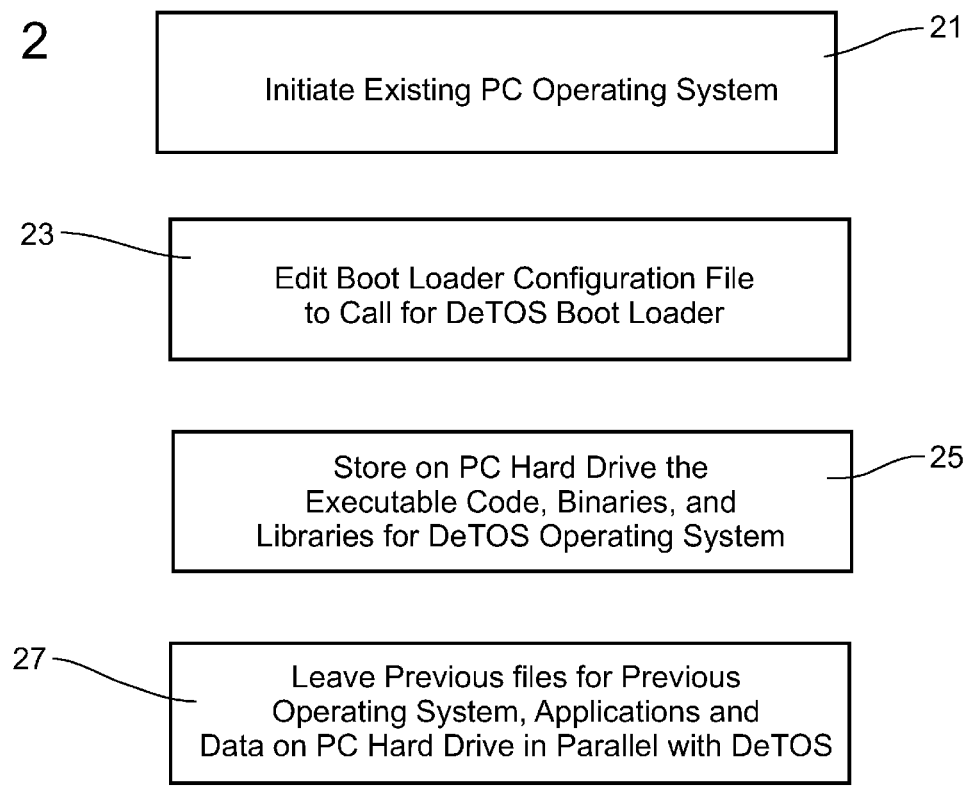
FIG. 2 is a logic flow diagram of the re-purposing procedure for the personal computers.

As reflected in FIG. 2, the personal computer 15 is booted up at step 21 with the normal operating system before the loading of the repurposing software, which edits the boot loader configuration file at step 23 to interrupt the normal boot sequence for the previous operating system on the personal computer 15 to call for the loading of the thin client operating system upon subsequent restart. Since the personal computer 15 is already operating under the previous operating system, no change in effective operation of the personal computer 15 will take effect until the next time the personal computer 15 is booted up, as reflected in step 29. The repurposing software at step 25 then loads a thin client boot loader and files containing the executable code, binaries, libraries and configuration files for the thin client operating system onto the hard drive 16 of the personal computer 15. This installation of thin client files onto the hard drive 16 is done, as noted at step 27, without deleting or erasing the existing operating files, application programs, or data from the hard drive, and without requiring a new partitioning of the hard drive 16. This loading of the thin client files onto the hard drive 16 without disturbing the existing files on the hard drive 16 is made possible because the initial kernel used by the repurposing software is capable of reading the NTFS file system.

With reference to FIG. 3, at step 31 the repurposing software is copied onto the target personal computer 15 either directly or through the central server computer 10. With the thin client operating system, referred to in FIG. 3 as the DeTOS operating system, installed at step 32 onto the personal computer 15, the repurposing of the personal computer 15 has been affected. Subsequent booting of the personal computer at step 33 brings the inquiry at step 35 as to whether the intent is to operate the personal computer 15 as a repurposed thin client computer. If affirmative or if no answer is entered, the DeTOS operating system gets started. If the inquiry response is negative, the previous operating system can be electively accessed at step 38, which as reflected in step 39 allows only access to applications and files previously stored on the hard drive 16. If the DeTOS operating system gets started, the Windows operating system is not running, and therefore no virus targeting the Windows operating system can infect the computer.

When operating on the DeTOS operating system, the repurposed computer cannot access files pertaining to the previous operating system or any of the other application or data files on the hard drive 16. Because the DeTOS operating system does not allow reading or modifying any file belonging to the Windows operating system on the hard drive, the data on the hard drive cannot be read or copied from another personal computer or server on the network. The data is inaccessible to the DeTOS operating system, user and processes and can therefore not be stolen.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of converting a personal computer having an initial operating system stored into a memory device on said personal computer, into a thin client computer that is operatively connected to a server computer to be centrally managed, comprising the steps of:
    loading repurposing software onto said personal computer, including a thin client operating system in parallel with said initial operating system;
    editing a boot file on said personal computer to insert a command to access a thin client operating system before executing commands to load said initial operating system, said initial PC operating system being interrupted and rendered inoperative when said personal computer is re-booted, said initial operating system remaining on said memory device along with application files previously stored thereon; and
    by-passing said initial operating system and operating said personal computer as a thin client computer that can be managed centrally without accessing said initial operating system or said application files on said memory device.

2. The method of claim 1 further comprising the step of: providing a elective option to boot said personal computer into said initial operating system.

3. The method of claim 2 wherein said thin client operating system is a default operating system for said personal computer.

4. The method of claim 3 wherein said editing step inserts a command into a configuration file of said initial operating system.

5. The method of claim 4 wherein said loading step stores executable code, binaries and libraries of said thin client operating system onto said memory device without erasing existing files on said memory device.

6. The method of claim 5 wherein said loading step is accomplished without requiring a partitioning of said memory device.

7. The method of claim 6 wherein said loading step is accomplished by said server computer loading files on said personal computer.

8. The method of claim 6 wherein said loading step is accomplished by directly placing said repurposing software onto said personal computer.

9. A method of extending an effective operative life of a personal computer having an initial operating system stored into a hard drive on said personal computer by converting said personal computer into a thin client computer that is operatively connected to a server computer to be centrally managed from said server computer, comprising the steps of:
    storing executable code, binaries and libraries of a thin client operating system onto said hard drive without erasing existing files on said hard drive;
    editing a configuration file of said initial operating system to insert a command to execute a boot sequence for said thin client operating system before executing commands to load said initial operating system, said initial PC operating system being interrupted and rendered inoperative when said personal computer is re-booted, said initial operating system being retained on said personal computer in an operative state in parallel with said thin client operating system; and
    by-passing said initial operating system and operating said personal computer as a thin client computer that is centrally managed by said server computer such that said personal computer cannot access application and data files on said hard drive.

10. The method of claim 9 wherein said thin client operating system is a default operating system for said personal computer.

11. The method of claim 9 wherein said loading step is accomplished without requiring a partitioning of said memory device.

12. The method of claim 9 further comprising the step of: providing a elective option to boot said personal computer into said initial operating system.

13. The method of claim 9 wherein said loading step is accomplished by said server computer loading files on said personal computer.

14. A method of repurposing personal computers operating under an initial PC operating system into a thin client operating system to operate as a thin client computer that that is operatively connected to a server computer to be centrally managed, comprising the steps of:
    booting said personal computer using said initial PC operating system;
    editing a boot loader file in said initial PC operating system to add a command to access a thin client configuration file before said personal computer is booted into said initial PC operating system, said initial PC operating system being interrupted and rendered inoperative when said personal computer is re-booted;

loading thin client executable files, said thin client configuration file, thin client binaries and thin client libraries onto a hard drive on said personal computer in parallel with said initial PC operating system without erasing any files from said initial PC operating system; and re-booting said personal computer to convert said personal computer into a thin client computer, whereby said personal computer by-passes said initial PC operating system to operate through said thin client configuration file, making said thin client operating system the default operating system for said personal computer.

\* \* \* \* \*